United States Patent
Snyder

Patent Number: 5,259,646
Date of Patent: Nov. 9, 1993

[54] MULTIFUNCTION ONE-PIECE BRACKET TO SUPPORT A STEERING COLUMN ASSEMBY AND BRAKE PEDAL SUPPORT BRACKET IN AN AUTOMOBILE

[75] Inventor: Mark D. Snyder, Clawson, Mich.

[73] Assignee: Nissan Research & Development, Inc., Farmington Hills, Mich.

[21] Appl. No.: 854,979

[22] Filed: Mar. 20, 1992

[51] Int. Cl.⁵ .............................................. B62D 1/11
[52] U.S. Cl. ................................... 280/777; 280/779; 296/189
[58] Field of Search .................. 280/777, 779; 74/492; 180/90, 90.6; 296/70, 189, 192

[56] References Cited

U.S. PATENT DOCUMENTS

| | | | |
|---|---|---|---|
| 4,086,825 | 5/1978 | Badcock et al. | 280/777 |
| 4,228,695 | 10/1980 | Trevisson et al. | 280/777 |
| 4,733,739 | 3/1988 | Lorenz et al. | 180/90 |
| 4,738,469 | 4/1988 | Ushijima et al. | 280/777 |
| 4,838,576 | 6/1989 | Hamasaki et al. | 280/777 |
| 5,039,126 | 8/1991 | Prato et al. | 280/750 |
| 5,056,818 | 10/1991 | Sadakata | 280/777 |
| 5,082,078 | 1/1992 | Umeda et al. | 180/90 |
| 5,085,467 | 2/1992 | Converse | 280/777 |
| 5,088,571 | 2/1992 | Burry et al. | 180/90 |

Primary Examiner—Margaret A. Focarino
Assistant Examiner—Paul Dickson
Attorney, Agent, or Firm—Lowe, Price, LeBlanc & Becker

[57] ABSTRACT

A multipurpose, lightweight, sheet metal bracket having a U-shaped cross-section is provided with tablike extensions of the sides of the U-shape for attachment thereto of other vehicle components. The sheet metal bracket itself can be spot-welded at a number of points to correspondingly disposed portions of an automobile internal structure for strong, rigid, permanent location to provide strong support to the steering column assembly and the brake support bracket of the automobile. Space above the sides of the U-shaped cross-section of the bracket provides safe passage for wiring between elements in the instrument panel assembly and cooperating elements in the engine compartments. In the event of a collision experienced by the automobile, reactive movement of the steering column assembly, both in translation and in rotation in a manner as would affect the driver of the automobile, is controlled and limited, with portions of the support bracket undergoing controlled deformation at deliberately provided bend zones, with limited movement between the support bracket and the steering column assembly allowed by attachment at elongate apertures in the bracket.

12 Claims, 6 Drawing Sheets

MULTIFUNCTION ONE-PIECE BRACKET TO SUPPORT A STEERING COLUMN ASSEMBY AND BRAKE PEDAL SUPPORT BRACKET IN AN AUTOMOBILE

FIELD OF THE INVENTION

This invention relates to a support bracket for supporting an automobile steering column assembly to the internal body structure, and more particularly to a one-piece bracket which not only rigidly supports the steering column assembly to the internal body structure of the automobile but also provides support to a brake pedal support bracket, limits rearward motion and rotation of the steering wheel column in the event of a frontal collision of the automobile, and serves to support the main electrical wiring harness from the engine compartment to portions of the automobile instrument panel.

BACKGROUND OF THE PRIOR ART

Modern automobiles typically comprise a plurality of formed sheet metal parts which are either bolted or spot-welded to each other to provide a lightweight structure defining spaces for accommodating electrical and mechanical components of the automobile, the passengers, and assorted other objects. Almost all major industrial countries have laws and detailed regulations concerning passenger safety, automobile fuel economy, and the like. Auto manufacturers, therefore, are continually searching for optimum designs which enable them to compete with other manufacturers on the basis of improved fuel economy, additional safety for occupants of the automobile, ergonomically designed passenger cabins, and reduced costs. One design consideration that can help in all these regards is to reduce the number of individual elements that must be assembled to form the completed automobile. This can be accomplished by designing individual elements of the automobile structure to perform a plurality of functions for increasing the rigidity and strength of the overall structure and, whenever possible, contributing to a reduction in the hazards to which occupants of the automobile may be exposed in the event of impacts.

Popular automobile designs now incorporate what is referred to as a "cabin forward" configuration, and are typically powered by transversely disposed engines requiring a relatively small amount of space in the lengthwise direction. Cabin forward automobiles typically have the front windshield inclined to extend quite far forward over a relatively wide dash. While this may assist in providing an overall streamlined shape to the automobile, it poses problems for the designer on how best to support the steering column assembly as well as other user-operated elements such as the brake pedal typically attached to an arm pivotable about its uppermost end.

Brackets used for such purposes should be light in weight but strong enough to ensure that supported components remain in place over long periods of time even when subjected to a certain amount of operator abuse, and must also provide safety to the driver by limiting the rearward travel and/or rotation in a vertical plane by the steering wheel when the automobile is involved in a front end collision. As noted, the cabin forward configuration tends to extend the cowl-end portions of the passenger compartment in the forward direction. Therefore, the steering column assembly bracket must be shaped to be inherently rigid and must be attached at a number of points to the automobile body structure to ensure strong support for the steering column assembly. Preferably, it should also enable control to be exercised over the translational and rotational movements of the steering column and steering wheel in the event of a frontal impact. The known prior art contains examples of the use of a plurality of individual brackets to accomplish these purposes. The inclusion of a number of brackets performing separate functions naturally involves what may be avoidable costs in manufacturing the automobile and perhaps unnecessary weight and, therefore, reduced fuel economy.

U.S. Pat. No. 4,733,739 to Lorenz et al discloses a U-cross-sectioned sheet metal bracket called a "pedal block", one end of which connects to a portion of the steering column assembly, which between the arms of an inverted U-shape provides pivotable support to a brake pedal bracket, and at one of the arms of the U-shape provides pivotable support to another pedal. However, a mounting strap, namely, a second element, is employed to provide additional support to the pedal bracket. This reference does not appear to teach a structure which would exercise control over the rotation that might be experienced by the steering column in a frontal impact to the automobile, and the inverted U-shape does not appear to provide protection and guidance to incidental wiring.

U.S. Pat. No. 5,088,571 to Burry et al teaches a structure involving a plurality of brackets which are variously attached to transverse members of the body structure and coact to support the steering column assembly and one or more foot-operated pivotable pedals.

U.S. Pat. No. 4,838,576 to Hamasaki et al teaches a mechanism which includes guides, each having a generally U-shaped guide surface, between which an impact absorbing plate undergoes forcible permanent deformation and stretching to absorb energy in the event that a frontal impact tends to cause the steering assembly to move toward the driver.

U.S. Pat. 4,738,469 to Ushijama et al teaches the provision of separate brackets for supporting the steering column assembly and a pivotable brake pedal, in such a manner that the steering column is permitted to rotate around one of the brackets under the action of a collision impact force.

Figure 6:
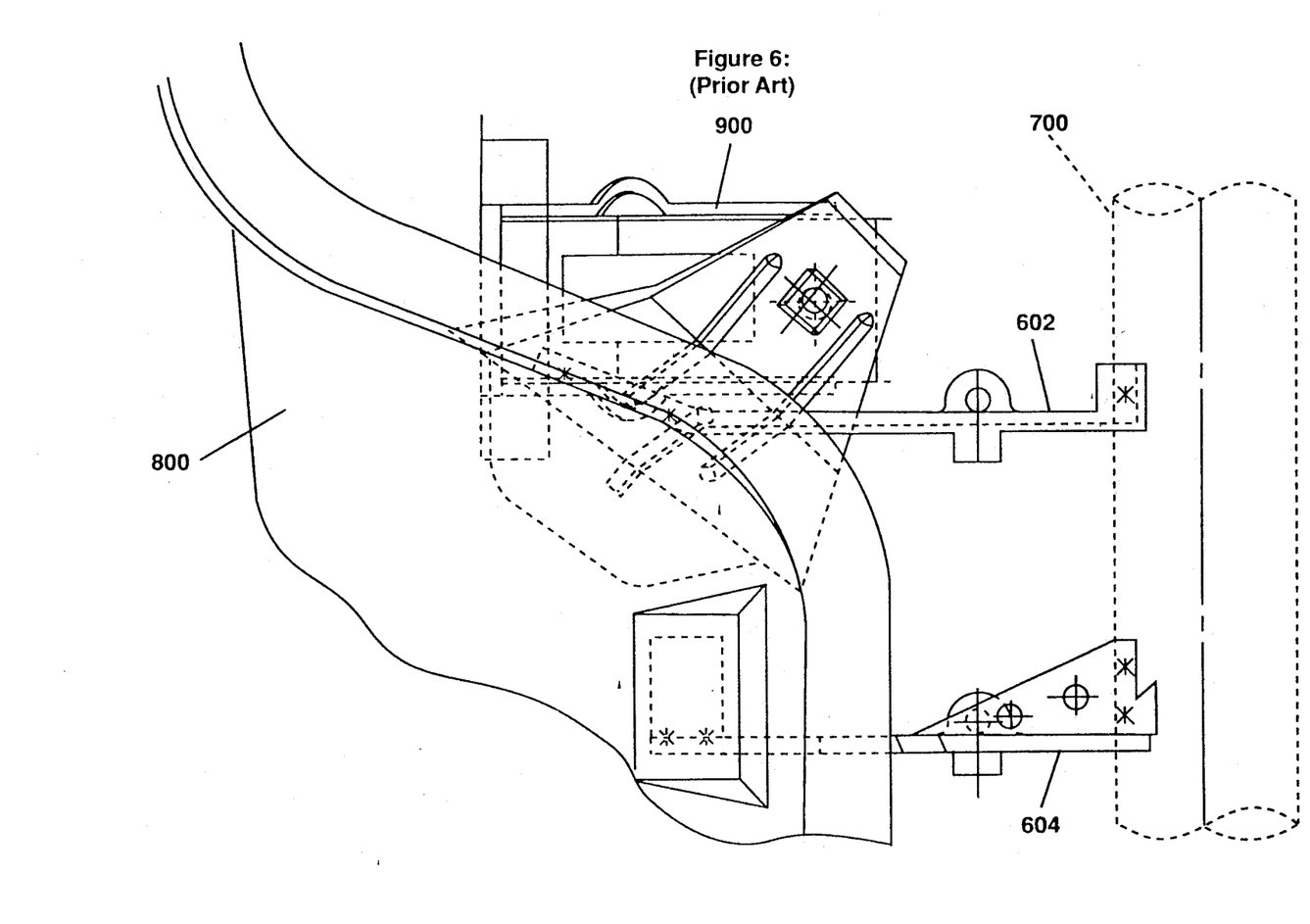
FIG. 6 is a plan view of a known multi-bracket structure.
Figure 7:
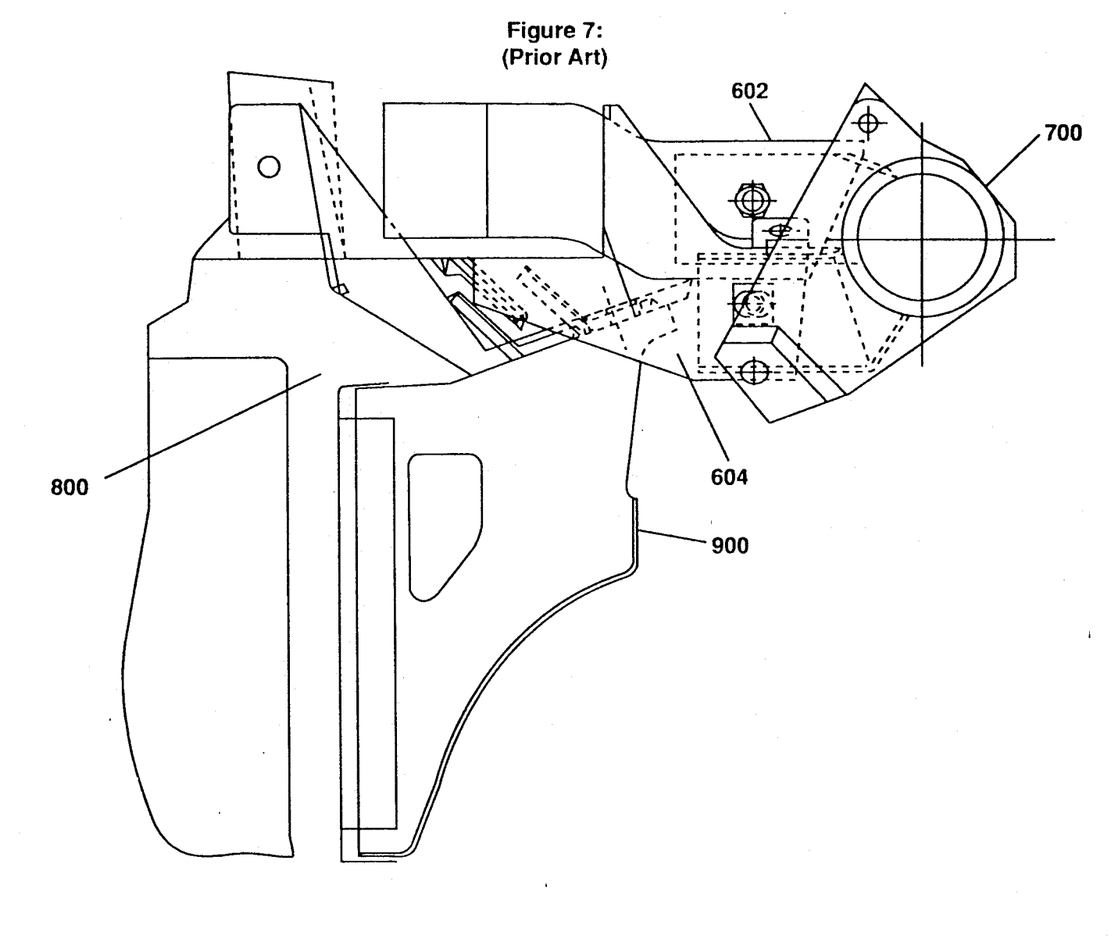
FIG. 7 is a side view of the multi-bracket structure per FIG. 6.

Also known are other structures of the type exemplified in FIGS. 6 and 7 of this application, which show respective plan and side views of known bracket structures. The illustrated structures include inner and outer steering member anti-rotation brackets 602 and 604 respectively, which connect to the steering column assembly 700 to the automobile cowl structure 800 and to upper portions of a brake pedal support bracket 900. As will be appreciated, the manufacture, inventory, handling and assembly of such a plurality of separate parts involves time and expense which it is desirable to minimize.

There is, therefore, a need for a multi-function one-piece bracket which is strongly attachable to an internal body structure of the automobile at a multiplicity of points, is inherently strong and rigid, which provides support for a brake pedal support bracket even in a cabin forward configuration, which enables control to be exercised over the translational and rotational reactive movements of the steering column assembly when the automobile is subjected to a frontal collision, and which provides safe support and guidance to the main wiring harness leading to and from the instrument panel assembly and equipment mounted thereto.

SUMMARY OF THE INVENTION

Accordingly, it is a principal object according to a preferred embodiment of this invention to provide a multi-function one-piece bracket to support to an inside front part of an automobile cabin structure both a steering column assembly and a brake pedal support bracket.

It is another object of this invention to provide a multi-function one-piece bracket to support to an inside front part of an automobile cabin structure a steering column assembly in such a manner that rearward translation and rotation of the steering column assembly are both controlled when the automobile is subjected to a frontal impact.

It is yet another object of this invention to provide a multi-function one-piece bracket to support to the inside front part of a cabin forward type automobile cabin structure both a steering column assembly and a brake pedal support bracket of the automobile, while providing support and guidance to electrical wiring to and from elements mounted to the instrument panel assembly.

These and other related objects are met by providing a multi-function one-piece bracket to support to an inside front part of an automobile cabin structure both a steering column assembly and a brake pedal support bracket, wherein the structure comprises:

an elongate first end portion;

integral with the first end portion a longitudinal central portion having a U-shaped cross-section comprising a bottom and first and second sides; and cantilevered a planar, elongate first and second mounting tabs, respectively elongately contiguous with the first and second sides of the central portion, wherein the first mounting tab is formed to have at least one elongate aperture oriented lengthwise in a selected direction; and the second mounting tab is substantially parallel to and spaced apart from the first mounting tab, and comprises tab attachment means for attaching the second mounting tab to an external object.

DETAILED DESCRIPTION OF THE PREFERRED EMBODIMENTS

Figure 1:
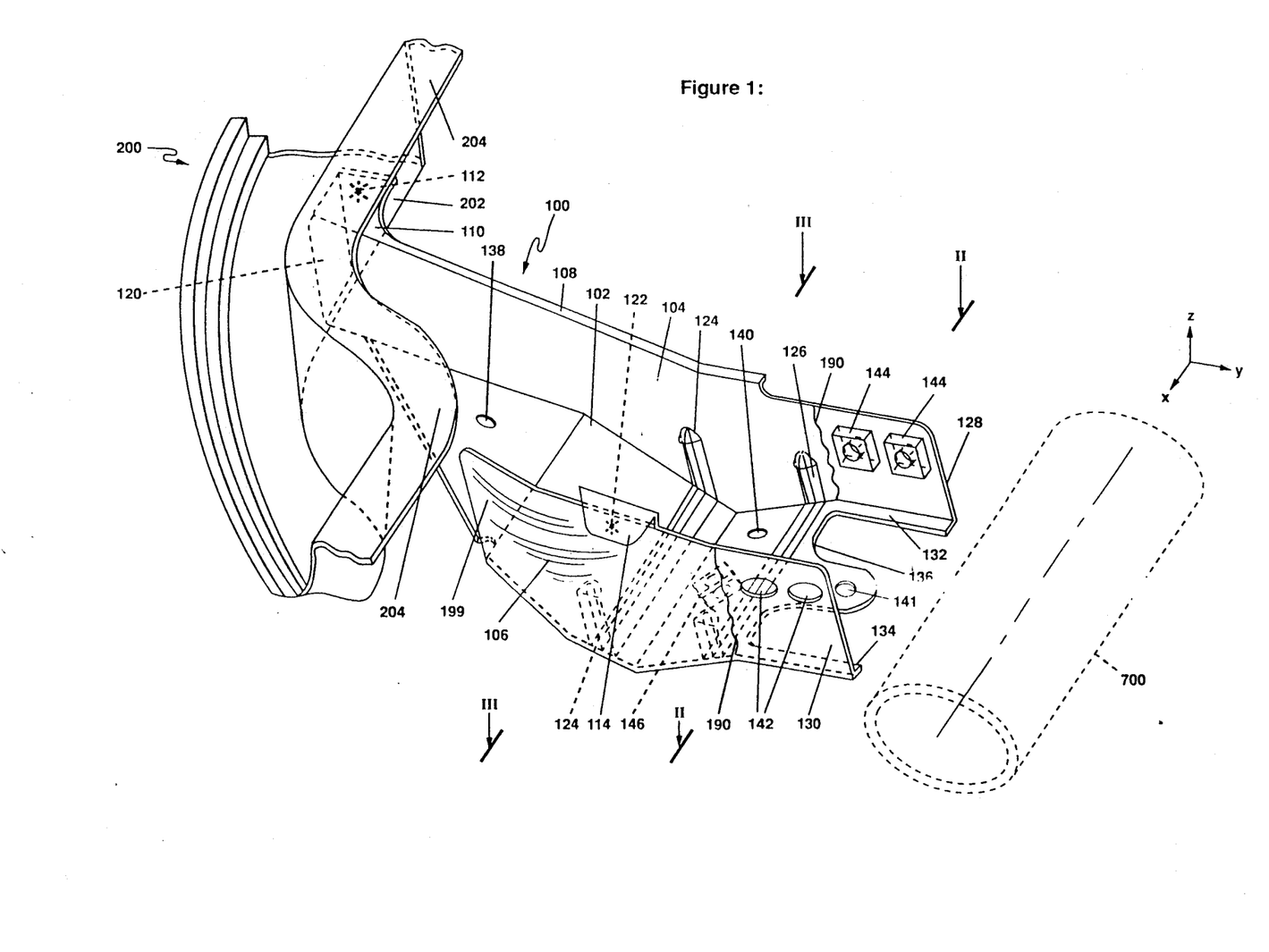
FIG. 1 is a partial respective view of a portion of a cabin forward type structure for an automobile, to illustrate the bracket according to a preferred embodiment of this invention in conjunction with a portion of the cowl structure and the steering column of the automobile.

FIG. 1 illustrates in a perspective view of the preferred embodiment of the multipurpose one-piece bracket, with partially sectioned portions of a typical automobile cowl structure and a steering column generally indicated in conjunction therewith. The cowl structure, especially in a cabin forward type of automobile provides transverse structural integrity to the forward-most part of the passenger cabin and provides support for the dashboard. Underneath the dashboard, there is located an array of heating and ventilating ducting, wiring, radio and tape player equipment, extensions of assorted operator-manipulated controls, and auxiliary equipment such as windshield wiper motor assembly, heating and air conditioning heat exchanger units, and the like (not shown for simplicity).

Occasional access to such elements under the dashboard must be provided for by the designer. At the same time, however, the cowl structure must be designed to provide attachment to support elements which must remain permanently in place but which could be subjected to externally applied violent forces if the automobile experiences a front impact. As generally indicated in FIG. 1, the typical cowl structure 200 has vertical and horizontal surfaces 202 and 204 respectively which provide known locations for spot-welding or bolting on of permanently attached elements. Such elements are permanently attached before placement and affixation of the instrument panel (not shown for simplicity) which is typically made of a plastics material to provide resilient energy-absorbing surfaces which may be contacted by occupants of the front seat of the automobile.

As is seen in FIG. 1, bracket 100 has a generally elongate form which includes a bottom 102 and, continuous therewith, opposite sides 104 and 106, of which side 104 is illustrated as being somewhat longer. Bottom 102 is not a single simple plane but comprises a plurality of contiguous segments inclined with respect to each other to contribute to the overall stiffness of the bracket structure.

Figure 2:
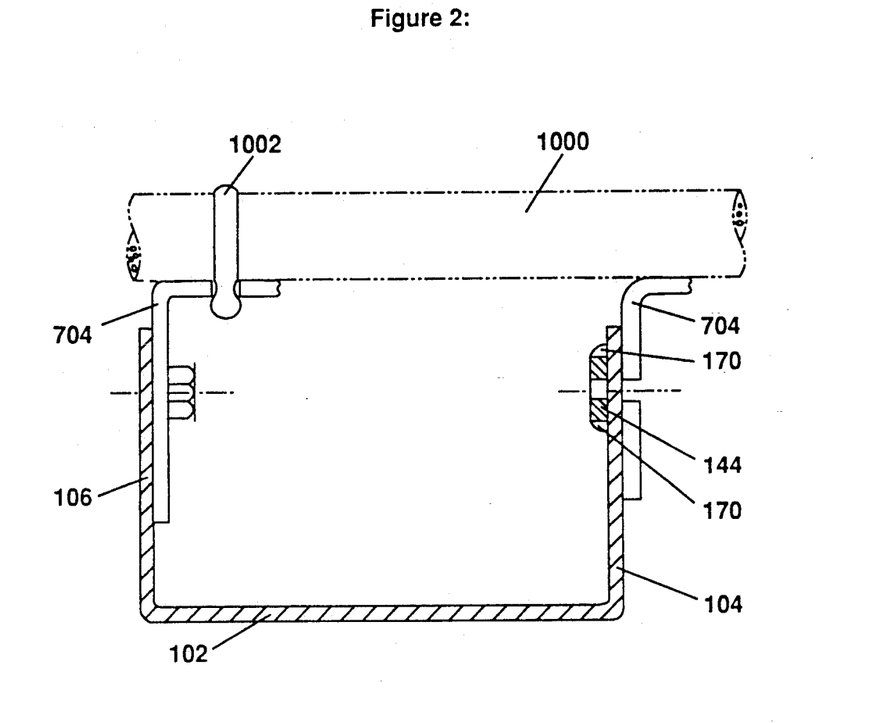
FIG. 2 is a cross-sectional view of the mounting bracket according to the preferred embodiment of this invention per FIG. 1 at Section II—II.
Figure 3:
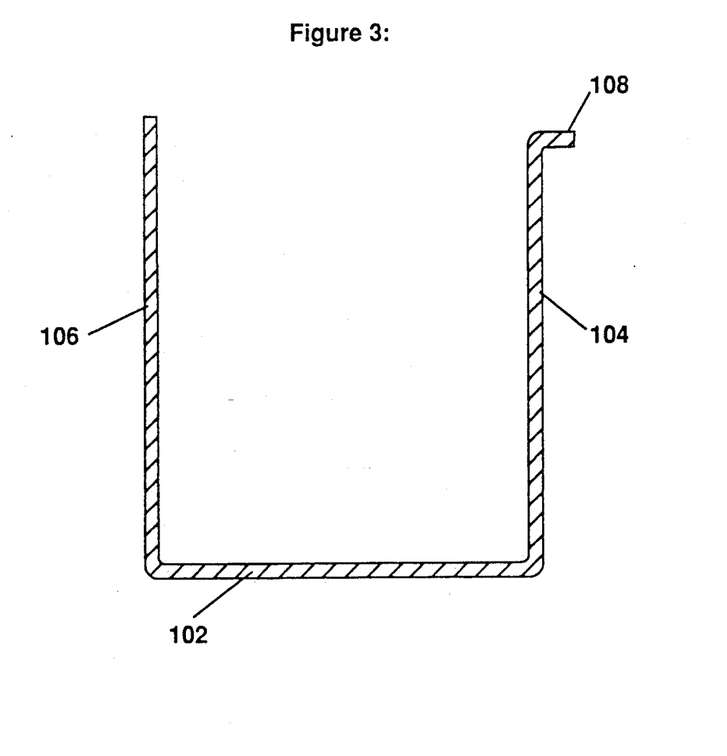
FIG. 3 is a cross-sectional view of the mounting bracket according to the preferred embodiment of this invention per FIG. 1 at Section III—III.

As best seen in FIGS. 2 and 3, this U-shaped cross-section has different dimensional proportions at different locations on bracket 100. Overall, however, the bottom 102 and sides 104 and 106, together provide a substantial portion having a U-shaped cross-section. FIG. 2 is a transverse cross-sectional view at Section II—II (as best understood with reference to FIG. 1) and FIG. 3 is a similar transverse cross-sectional view corresponding to Section III—III.

As indicated in phantom lines in FIG. 2, the main wiring harness 1000, which preferably comprises a plurality of wires contained in a strong flexible protective sheath, may be clipped by a known retaining clip 1002 to brackets 704,704 welded to steering column assembly 700.

As is readily seen from a combined consideration of FIGS. 1, 2 and 3, additional rigidity is provided to the longer side 104 by providing along an edge thereof a relatively narrow elongate flange portion 108 which at the extended end of side 104 widens somewhat to provide a weldable flange portion 110 illustrated as being spot-welded at spot-weld 112 to a horizontal surface 204 of the cowl structure. As will be readily appreciated by persons of ordinary skill in the art, a known alternative to such a spot-weld 112 would be the provision of a screw or bolt (not shown) which would have to pass through, suitably located apertures in horizontal cowl surface 204 and flame portion 110 of bracket 100. Such details being readily comprehended by such persons, details of such alternatives will not be discussed extensively.

Figure 4:
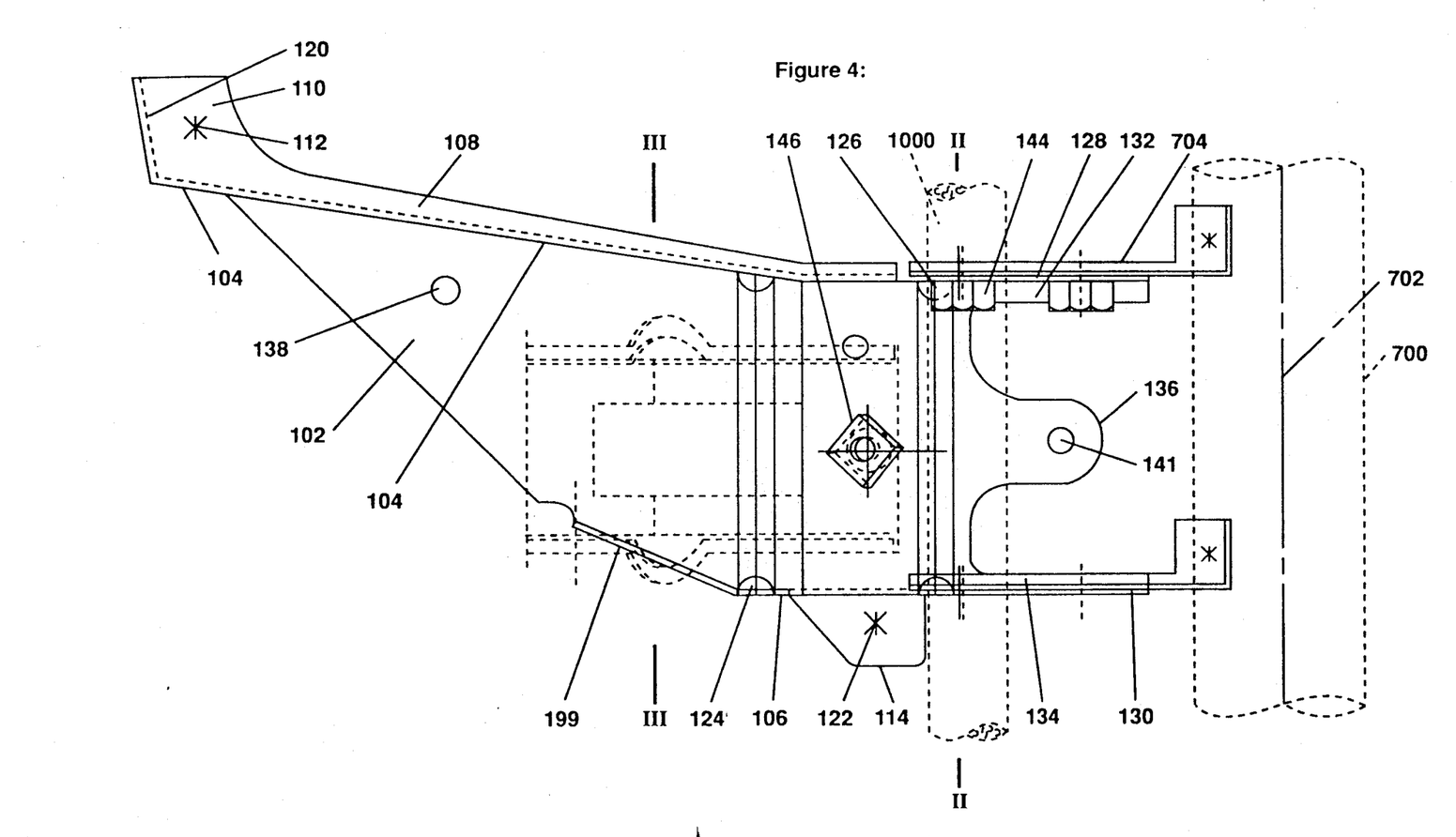
FIG. 4 is a plan view of the mounting bracket per FIG. 1.
Figure 5:
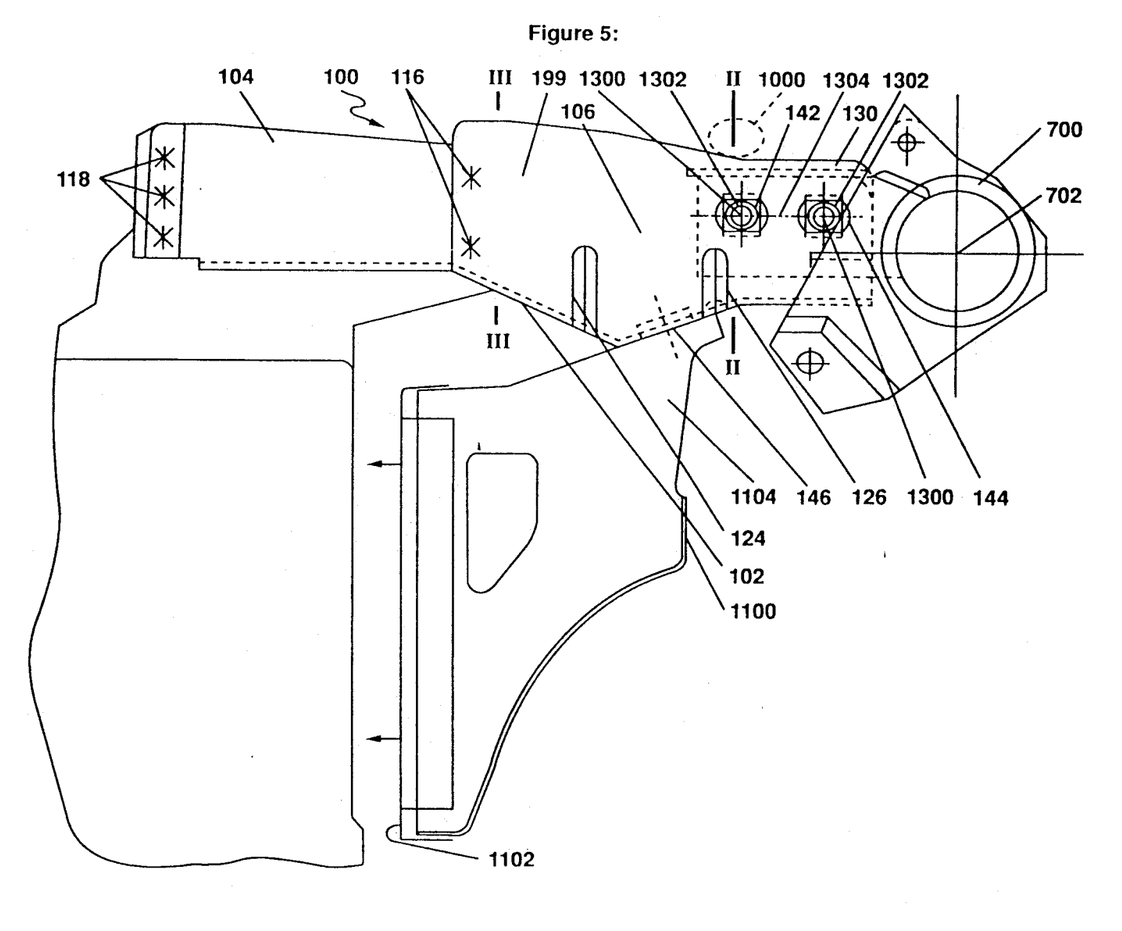
FIG. 5 is a side view of the mounting bracket per FIG. 1.

Because FIG. 1 is intended to be explanatory and is not a finished engineering drawing, bracket 100 as shown therein is not shown as disposed in its final welded-in-place manner. Accordingly, a transversely extending flange portion 114 contiguous with and bent with respect to an upper edge of side 106, as best seen in FIGS. 1 and 4, is not shown in a final welded location. Such welding would join the bracket thereat to another cooperating portion of the automobile body structure (not shown for simplicity). Likewise, the end of side 106 immediately adjacent the vertical cowl surface 202 (best understood with reference to FIG. 1) is not shown as welded-in-place. Reference to FIG. 5, however, indicates where spot-welds 116,116 and 118,118,118 advantageously may be utilized at the forwardmost ends of sides 106 and 104 respectively. 106 is angled toward side 104 near bead 124, as best seen in FIGS. 1, 4 and 5;

The welds 118,118,118 may conveniently be formed at a transverse contiguous extension 120 formed at the very end of side 104 to be contiguous therewith and with flange 110. By providing this form, which amounts to forming a three-sided corner comprising the end portion of side 104, flange 110, and end portion 120, the forwardmost end of side 104 is made very strong, rigid, and weldable in two directions simultaneously, thereby providing a very strong rigid attachment between the bracket end and portions 202 and 204 of the cowl structure 200. Likewise, by providing spot-weld 116,116 along the forwardmost edge of side 106 (indicated as somewhat turned-in toward side 104, as best understood with reference to FIG. 5) additional rigidity and strength of attachment are provided between bracket 100 and cowl structure 200. Note that this slight turn-in of side 106 toward side 104 creates additional rigidity at the junction of bottom 102 and side 106. Such aspects of design are utilized liberally to ensure in the single one-piece metal bracket 100 significant amounts of rigidity and strength in all principal directions along which forces can be successfully received without unacceptable deformation. Such design considerations are extremely important to ensure that the lightweight, thin, sheet metal bracket formed at a reasonable expense can meet all of the stated objectives of this invention.

It cannot be emphasized too strongly that the provision of spot-welds 112, 116, 118 and 122 (at transverse flange portion 114 of side 106), provide a quickly applied, very strong, rigid and permanent attachment of bracket 100 to the internal body structure of the automobile. Such spot-welds can be formed manually but, in modern factories, are rapidly and precisely formed by computer-controlled robotic machinery.

Additional structural forming is deliberately provided to enhance the rigidity of the lightweight one-piece bracket 100 as follows. As best understood with reference to FIGS. 1, 4 and 5, two deformation beads 124 and 126 (of generally C-shaped cross-section) preferably are provided, respectively located adjacent the lowest point in bracket 100 very close to Section III—III and at the forwardmost and widest end of bracket 100 immediately forward of Section II—II (as best understood with reference to FIGS. 1 and 4).

Sides 104 and 106 extend (to the right in FIGS. 4 and 5) in the form of tabs 128 and 130, of generally rectangular form and preferably with rounded upper corners, as best understood with reference to FIGS. 1 and 5. The forwardmost portion of bottom 102 is preferably extended to provide narrow inward flanges 132,134 to tabs 128 and 130, respectively, to provide additional stiffness in limited manner. Furthermore, tabs 128 and 130 are oriented to be orthogonal to axis 702 of the steering column asembly 700. This is best understood with reference to FIGS. 1 and 4. Furthermore, a central portion of bottom 102 has a planar extended tongue 136, between tabs 128 and 130 for connection thereat of supporting components as best understood with reference to FIGS. 1 and 4.

The preceding paragraphs substantially describe in detail the general form of bracket 100 and the manner in which it is spot-welded or otherwise permanently attached to the internal body structure of the automobile. A description will now be provided of means for attaching the welded-in-place bracket 100 to other automobile components such as a steering column assembly, a brake support bracket, and the like.

As best understood with reference to FIGS. 1 and 4, there may be provided simple apertures (138 and 140 in different portions of bottom 102), 141 (in extended tongue portion 136 between tabs 128 and 130), elongate apertures like 142,142 (in tab 130) or apertures to which are concentrically attached internally threaded nuts such as 144,144 (in tab 128) or 146 (in bottom 102). Nuts 144 and 146 are conveniently attached by spot welds 170,170 at their corners. See FIG. 2. Obvious alternatives for such means for attaching various components to bracket 100 in detachable manner, e.g., the clip 1002 holding wiring harness 1000, would be readily apparent to persons of ordinary skill in the art and need not be discussed further.

Similarly, suitable elements must be provided to the components which are to be attached to bracket 100 to permit their respective attachments. Such elements may take the form of flanges, threaded extensions, or the like, of any known and suitable kind. Hence, specifics of such incidental structures are not illustrated or described in detail.

As indicated in the listed objects of this invention, it is intended that bracket 100 provide support to a brake support bracket as well. As best seen in FIG. 5, such a brake support bracket 1100, attached,. to the automobile body structure under vertical cowl surface 202 at a side portion 1102, can be..attached at an uppermost portion 1104 to the nut 146 provided in bottom 102 of bracket 100. This can be accomplished by threaded engagement of a bolt (not shown for simplicity) passing through a suitable aperture provided in part 1104 of brake support bracket 1100 and engaging with the internally threaded nut 146. Such an attachment between bracket 100 and brake support bracket 1100 serves to make the entire assembly even more rigidly attached to the body structure, thereby enhancing the pivotable support provided by brake support bracket 1100 to a brake pedal depending pivotably therefrom. It also enhances the rigidity with which steering column assembly 700 is supported to the upper body structure of the automobile.

Another stated objective of the present invention is to provide support to the steering column assembly via multipurpose one-piece bracket 100 in such a manner that in the event of a front impact the reactive movement of the steering column assembly 700 will be controlled. This is accomplished by two design aspects incorporated within bracket 100, as explained more fully hereinbelow.

Note that the apertures 142,142 formed in tab 130 are elongated. As a consequence, as best understood with reference to FIG. 5, portions of the steering column assembly which engage with tab 130, e.g., by the use of nuts, bolts and washers, can have a limited amount of movement along the length of the elongate apertures 142,142. This is also helpful during initial assembly of the automobile as the steering column assembly is installed. As is readily seen in FIG. 5, the center lines 1300,1300 such attachment bolts 1302,1302 can move along the line 1304 to a limited extent without physical tearing or deformation of tab 130, to the extent that the controllably applied attachment forces incidental to the attaching means engaging with elongate apertures 142,142 allow this. Furthermore, although narrow inward flanges 132 and 134 of bottom 102, are contiguous with and transversely oriented with respect to tabs 128 and 130 and provide some additional rigidity to the tabs, upon experiencing a sufficiently strong external force the steering column assembly 700 may in turn exert enough force on tabs 128 and 130 to cause them to bend at locations 190,190 indicated by wavy lines in FIG. 1. These may be regarded as "bending zones" at which tabs 128 and 130 may bend, just forwardly of reinforcement bead 126 to allow a certain amount of limited rotational movement to the steering column assembly supported at tabs 128 and 130 while the rest of the structure of bracket 100 remains strongly attached to the internal body structure of the automobile.

By such deliberately designed-in features of the structure of bracket 100, i.e., the provision of elongate apertures 142,142 and "bending zones" 190,190, the present invention enables a single, multipurpose, light-weight, economical, easy-to-manufacture, sheet metal bracket 100 to provide strong support to a steering column assembly 700, provide support to a brake support bracket, and yet enable the steering column assembly 700 to undergo a limited controlled translational and rotational movement in response to external forces experienced during a vehicle collision. As indicated earlier, components such as the steering column assembly 700 and the brake support bracket can be attached to bracket 100 by conventional means, e.g., with nuts, bolts, screws, clips, and the like. Wiring from components such as the steering column assembly may also be safely guided within the space defined by the bottom 102 and sides 104 and 106 of bracket 100 to cooperating components and controls disposed underneath the cowl of the automobile.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A multifunction one-piece bracket to support to an inside front part of an automobile cabin structure both a steering column assembly and a brake pedal support bracket, comprising:
   an elongate first end portion;
   integral with the first end portion a longitudinal central portion having a U-shaped cross-section comprising a bottom and first and second sides; and
   cantilevered, planar, elongate first and second mounting tabs, respectively elongately contiguous with the first and second sides of the central portion and both oriented substantially orthogonal to an axis of the steering column assembly, when attached to the steering column assembly wherein
   the first mounting tab is formed to have at least one elongate aperture oriented lengthwise in a selected direction, and
   the second mounting tab is substantially parallel to and spaced apart from the first mounting tab and comprises tab attachment means for attaching the second mounting tab to an external object.

2. The multifunction one-piece bracket according to claim 1, wherein:
   the tab attachment means of the second mounting tab comprises at least one through aperture formed in the second mounting tab and an internally-threaded tab element attached to the second mounting tab to be concentric with said at least one through aperture.

3. The multifunction one-piece bracket according to claim 1, wherein:
   the first end portion has a distal end comprising a first lateral flange for permanent attachment to the automobile cabin structure.

4. The multifunction one-piece bracket according to claim 3, further comprising:
   a second lateral flange extending from the first side, located adjacent a base portion of the first mounting tab, for attachment thereat to the automobile cabin structure.

5. The multifunction one-piece bracket according to claim 1, further comprising:
   a planar extended tongue extending into a space intermediate the first and second mounting tabs.

6. The multifunction one-piece bracket according to claim 1, further comprising:
   first and second reinforcement beads, respectively formed in the central portion adjacent respective bases of the first and second mounting tabs and at a location intermediate the first and second mounting tabs and the elongate first end portion, for reinforcing and adding rigidity to the central portion.

7. The multifunction one-piece bracket according to claim 6, wherein:
   said first side has an end portion, intermediate the distal end of the enlongate first end portion of the bracket and the first bead, inclined toward the second side.

8. A multifunction one-piece bracket to support to an inside front part of an automobile cabin structure both a steering column assembly and a brake pedal support bracket, comprising:
   an elongate first end portion;
   integral with the first end portion a longitudinal central portion having a U-shaped cross-section comprising a bottom and first and second sides
   cantilevered elongate first and second mounting tabs, respectively elongately contiguous with the first and second sides of the central portion, wherein
   the first mounting tab is formed to have at least one elongate aperture oriented lengthwise in a selected direction, and
   the second mounting tab is substantially parallel with the first mounting tab and comprises tab attachment means for attaching the second mounting tab to an external object.

wherein the bottom comprises a bottom aperture means for enabling connection thereat to an upper mounting point of a brake pedal support bracket.

9. The multifunction one-piece bracket according to claim 8, wherein:
the bottom further comprises an internally threaded bottom element affixed to be concentric with the bottom aperture means.

10. A multifunction one-piece bracket to support to an inside front part of an automobile cabin structure both a steering column assembly and a brake pedal support bracket, comprising:
an elongate first end portion;
integral with the first end portion a longitudinal central portion having a U-shaped cross-section comprising a bottom and first and second sides;
cantilevered elongate first and second mounting tabs, respectively elongately contiguous with the first and second sides of the central portion; and
narrow elongate extensions of the bottom, respectively smoothly contiguous with the first and second sides, to provide added stiffness at respective bottom edges of the first and second sides,
wherein the first mounting tab is formed to have at least one elongate aperture oriented lengthwise in a selected direction, and the second mounting tab is substantially parallel with the first mounting tab and comprises tab attachment means for attaching the second mounting tab to an external object.

11. The multifunction one-piece bracket according to claim 10, further comprising:
a narrow transverse extension of the second side, along an edge of the second side away from the bottom, extending contiguously along the second side and the elongate end portion to provide additional stiffness thereto.

12. The multifunction one-piece bracket according to claim 11, further comprising:
a coplanar attachment extension of the bottom extending into a space intermediate the first and second mounting tabs;
a second lateral flange extending from the first side, located adjacent a base portion of the first mounting tab, for attachment thereat to the automobile cabin structure; and
first and second reinforcement beads, respectively formed in the central portion adjacent the respective bases of the first and second mounting tabs and at a location intermediate the first and second mounting tabs and the elongate first end portion, for reinforcing and adding rigidity to the central portion.

* * * * *

UNITED STATES PATENT AND TRADEMARK OFFICE
CERTIFICATE OF CORRECTION

PATENT NO. : 5,259,646
DATED : November 9, 1993
INVENTOR(S) : Mark A. SNYDER

It is certified that error appears in the above-indentified patent and that said Letters Patent is hereby corrected as shown below:

On the title page, please delete the title and insert the following therefor:

--MULTIFUNCTION ONE-PIECE BRACKET TO SUPPORT A STEERING COLUMN ASSEMBLY AND BRAKE PEDAL SUPPORT BRACKET IN AN AUTOMOBILE--;

Column 1, line 44, after "of" insert --front--.

Column 3, line 36, change "cantilevered a" to --cantilevered, --.

Column 5, line 1, delete ",";

Column 5, line 2, change "flame" to --flange--;

Column 5, line 21, after "respectively." insert --A portion 199 of side--.

UNITED STATES PATENT AND TRADEMARK OFFICE
CERTIFICATE OF CORRECTION

PATENT NO. : 5,259,646
DATED : November 9, 1993
INVENTOR(S) : Mark A. SNYDER

It is certified that error appears in the above-indentified patent and that said Letters Patent is hereby corrected as shown below:

```
    Column 6, line 47, delete ".,";
    Column 8, line 7, after "assembly" insert --,--;
    Column 8, line 48, change "enlongate" to --
elongate--;
    Column 8, line 58, after "sides" insert --, and--.
    Column 9, line 6, change "internally threaded" to
--internally-threaded--.
```

Signed and Sealed this

Tenth Day of May, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,259,646

DATED : November 9, 1993

INVENTOR(S) : Mark A. SNYDER

It is certified that error appears in the above-indentified patent and that said Letters Patent is hereby corrected as shown below:

Column 6, line 8, change "asembly" to --assembly--;

Column 6, line 49, change ".." to --,--.

Column 8, line 6, delete ",".

Signed and Sealed this

Eighteenth Day of October, 1994

Attest:

BRUCE LEHMAN

Attesting Officer

Commissioner of Patents and Trademarks